(12) United States Patent
Bahirat (10) Patent No.: US 11,138,104 B2
(45) Date of Patent: Oct. 5, 2021

(54) SELECTION OF MASS STORAGE DEVICE STREAMS FOR GARBAGE COLLECTION BASED ON LOGICAL SATURATION

(71) Applicant: INTEL CORPORATION, Santa Clara, CA (US)

(72) Inventor: Shirish Bahirat, Longmont, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/269,986

(22) Filed: Feb. 7, 2019

(65) Prior Publication Data

US 2019/0171564 A1 Jun. 6, 2019

(51) Int. Cl.
*G06F 3/00* (2006.01)
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0608* (2013.01); *G06F 3/0644* (2013.01); *G06F 3/0679* (2013.01); *G06F 2209/5011* (2013.01)

(58) Field of Classification Search
None
See application file for complete search history.

(56) References Cited

U.S. PATENT DOCUMENTS

| 2009/0168525 | A1* | 7/2009 | Olbrich | G06F 13/1657 365/185.11 |
| 2016/0266792 | A1* | 9/2016 | Amaki | G06F 3/0608 |
| 2018/0307598 | A1* | 10/2018 | Fischer | G06F 12/0253 |

* cited by examiner

*Primary Examiner* — Midys Rojas
(74) *Attorney, Agent, or Firm* — Compass IP Law PC (57) ABSTRACT

A method is described. The method includes tracking a logical saturation value for each of multiple streams having read and write commands directed to a mass storage device, wherein, a stream's logical saturation value is a measurement of how much of the stream's assigned storage resources of the mass storage device contains valid data. The method also includes repeatedly selecting for garbage collection whichever of the multiple streams has a lowest logical saturation value as compared to the other streams.

20 Claims, 6 Drawing Sheets

SELECTION OF MASS STORAGE DEVICE STREAMS FOR GARBAGE COLLECTION BASED ON LOGICAL SATURATION

FIELD OF INVENTION

The field of invention pertains generally to computing systems and, more specifically, to selection of mass storage device streams for garbage collection based on logical saturation.

BACKGROUND

Figure 1:
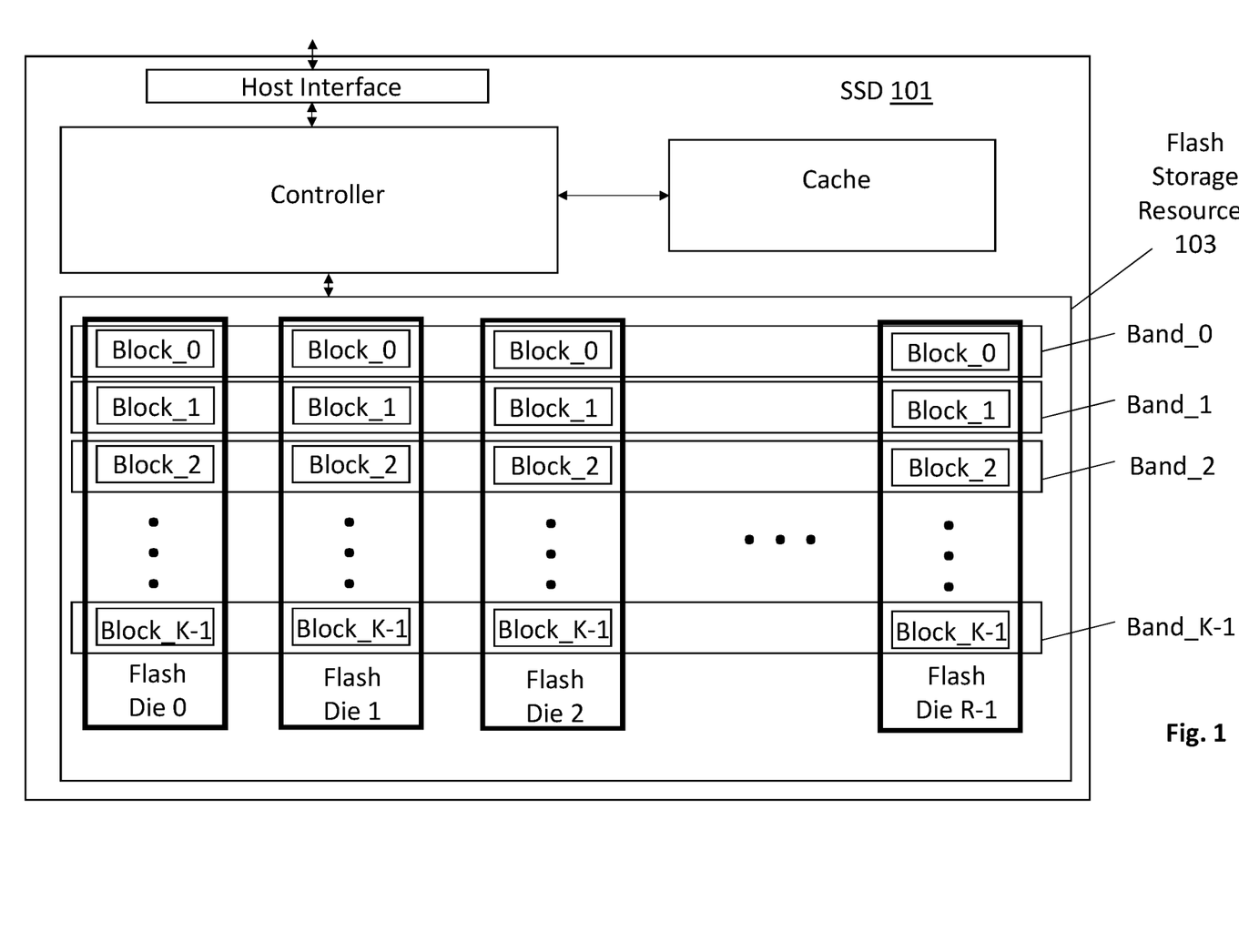
FIG. 1 shows a solid state drive.

FIG. 1 depicts and solid state drive (SSD) 101. The flash storage resources 103 of the SSD can be viewed as including multiple (R) flash die, where, each flash die includes a number (K) of separately writable blocks of flash storage cells. Here, a same positioned block across the R die corresponds to a "band" of flash blocks. Thus, as there are K separately writable blocks per die and R flash dies per SSD, there are K bands each having R storage blocks within the SSD. A block is the basic physical unit at which data is erased. Writes are programmed at page granularity and reads are accessed at some smaller access size typically maintained as a correctable code word of data.

Writing data to flash memory is a complicated process. As data cannot be directly overwritten on flash, old data must first be erased, after which new data may be written. The process by which the flash "reclaims" the physical areas that no longer have valid data is called "garbage collection." The garbage collection process entails consolidating valid data from a flash block, writing it to a different block, and then erasing the original block which frees up its space for new data (and effectively removes its invalid data). Because erasures are performed at block granularity, a block is the basic unit at which physical storage resources are reclaimed.

The garbage collection process impacts performance the more varied the lifetimes of the data within a block (where, lifetime corresponds to the amount of time the data sits in the block without change). That is, if the lifetimes of the data items within an average block of data greatly vary, the garbage collection process will spend more time re-writing valid items of data to other blocks prior to erasing the original block of data (an inefficiency referred to as "write amplification"). By contrast, if the average block of data contains data with uniform/same lifetimes, ideally, little/no time is spent re-writing valid data during garbage collection because all of the block's data becomes invalid within a same time window, and, the entire block can be erased without re-writing any valid data (the entire block is invalid when garbage collection begins).

Present and future Non Volatile Memory Express (NVMe) specifications (which are open logical device interface specifications for accessing non volatile storage media over a Peripheral Component Interface (PCI) Express (PCIe) link), therefore include "stream" technology in which the host appends a respective velocity to an item of data to be written into an NVMe compliant device (e.g., a solid state drive (SSD)). The velocity value indicates the data item's expected lifetime. The SSD will store items of data having similar/same lifetimes in a same data block so as to minimize write amplification (where data having same/similar lifetimes correspond to a particular stream).

Generally, during runtime, the SSD has to decide which blocks should be targeted for garbage collection. The traditional policy/algorithm for deciding which stream is to have its blocks next reclaimed is essentially based on stream data rate whereby streams having data that contain longer expected lifetimes (lower data rate) are more frequently chosen for reclaim than streams having data that contain shorter expected lifetimes (higher data rate). The underlying assumption of this approach is that the longer the SSD waits to reclaim a stream with shorter expected lifetime data, the greater the stream's invalid content will be when it finally commences garbage collection for the stream. As a consequence, less write amplification should result.

FIGURES

A better understanding of the present invention can be obtained from the following detailed description in conjunction with the following drawings, in which.

DETAILED DESCRIPTION

A problem with the streams approach, however, is that the more streams that an SSD handles having different data rates and/or different access behavioral patterns, the more difficult it is to avoid write amplification. In essence, the algorithm discussed in the Background that selects streams for garbage collection based solely on stream data rate is too simplistic.

Figure 2:
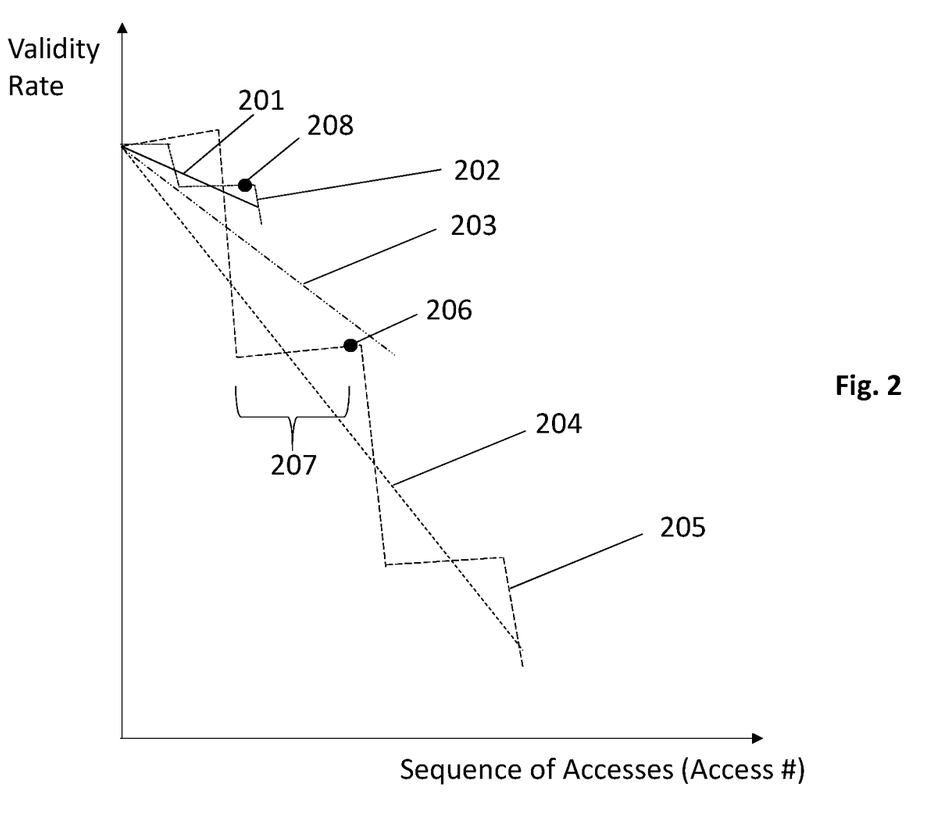
FIG. 2 shows a validity rates for different streams.

FIG. 2 provides a framework for understanding the deeper issues that can arise when selecting specific streams for garbage collection when multiple streams of varying overwrite behavior exist. Here, FIG. 2 shows validity rate for each of five streams as a function of the number of accesses received for each stream over a period of SSD runtime. Validity rate is the percentage of a stream's stored data that is valid. Here, at any instant of time, a stream's stored data will include valid data and invalid data. Invalid data is older data that has been overwritten but not yet erased as part of the garbage collection process.

As observed in FIG. 2 the different streams include: 1) two cold streams 201, 202 for which the SSD has received relatively few accesses over the time period; 2) two hot streams 204, 205 for which the SSD has received a relatively large number of accesses over the time period; and, 3) a warm stream 203 for which the SSD has received a moderate amount of accesses over the time period (accesses can be reads and writes, or just writes). For simplicity, no garbage collection operations are assumed to be performed over the SSD's runtime of FIG. 2.

Here, the "data rate" based stream selection method discussed in the background will purposely delay reclaiming the blocks of the two hot streams 204, 205 in favor of reclaiming the blocks of the two cold streams 201, 202 on the assumption that the hot streams are creating invalid data at a high rate (because they frequently overwrite their existing data) and the cold streams are creating invalid data at a low rate (because they infrequently overwrite their existing data). As such, the cold streams' blocks would be reclaimed at greater rapidity than the hot streams' blocks.

The above assumptions, however, are only accurate if overwrite operations of existing data occur evenly over time. Both cold stream 201 and hot stream 204 demonstrate this property as their respective validity rates steadily decay as their number of accesses grows (an even, steady flow of overwrites of existing data creates invalid data at a constant rate resulting in a steadily declining validity rate).

By contrast, cold stream 202 and hot stream 205 do not demonstrate this property. Rather, both cold stream 202 and hot stream 205 overwrite their existing data in "bursts" ("bursty" or "sequential" writing behavior). For both of these streams 202, 205 there are extended access sequences (or relatively long periods of time) in which little/no overwrites of existing data occurs and the invalidity rate remains approximately constant (the invalidity rate may increase modestly over time as any initial writes of new data will increase the amount of valid data).

These extended access sequences, however, are separated by short access sequences in which the stream is predominantly overwriting existing data at a high data rate. As such, streams 202, 205 are characterized by relatively constant validity rates marked with sudden drops in validity. The traditional algorithm of identifying streams for reclaim based solely on their data rate could ill serve both streams 202, 205 as write amplification or some other write related inefficiency is apt to arise depending on the timing of the garbage collection process for both streams.

That is, for example, with respect to hot stream 205 (for which the SSD would deliberately delay garbage collection), if the SSD delayed the garbage collection over access sequence 207 until point 206, the delay would not provide any benefit as little/no invalid data is created over access sequence 207. Moreover, a decision to garbage collect at point 206 will likely result in write amplification because the SSD will write/save large amounts of data that were valid at point 206 but were almost immediately declared invalid thereafter by way of the large burst overwrite that followed shortly after point 206. Likewise, with respect to the cold stream 202 (for which the SSD would choose to invoke garbage collection more frequently), if the SSD decided to invoke garbage collection at point 208, write amplification is again likely to result for same/similar reasons.

The traditional approach of selecting streams for garbage collection based solely on their respective data rates is therefore overly simplistic as a stream's exposure to write amplification or other write related inefficiencies can largely depend on the timing of when garbage collection begins and the pattern(s) of the stream's over-write behavior.

Figure 3:
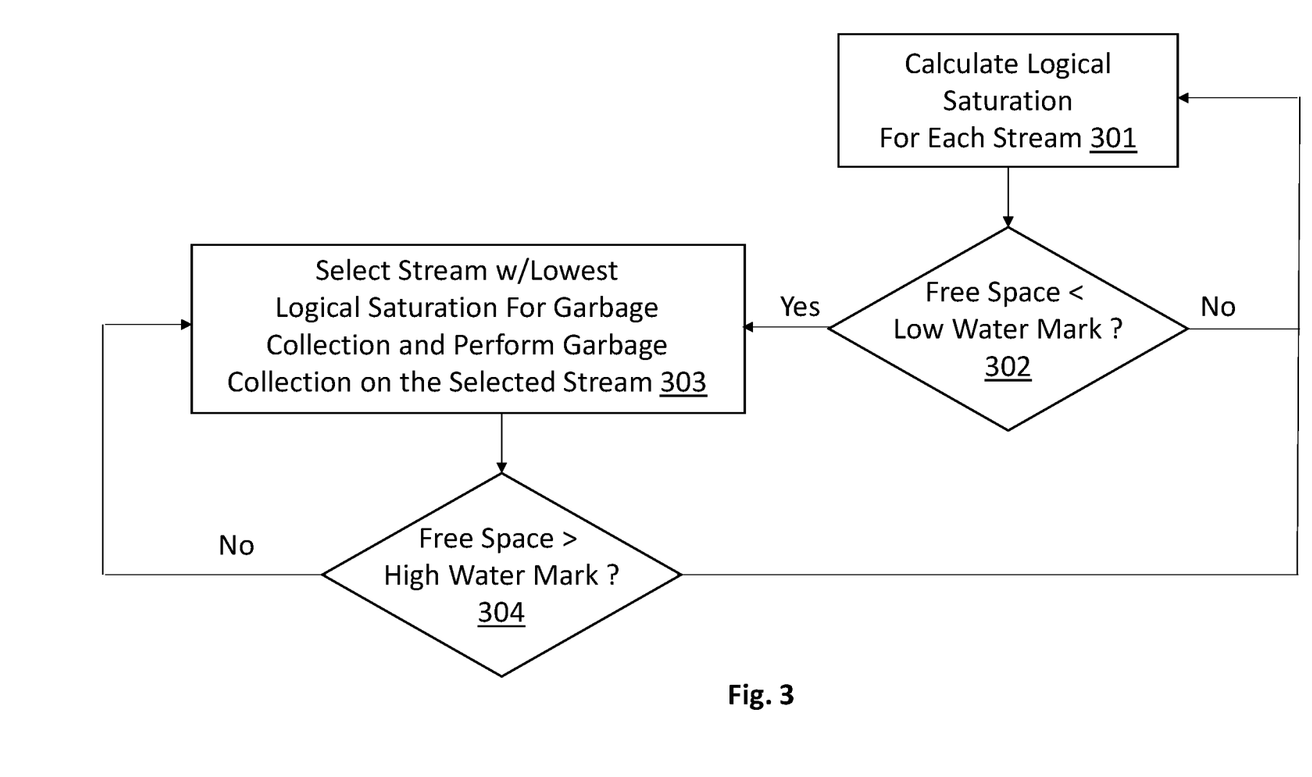
FIG. 3 shows an improved process for selecting a stream for garbage collection.

FIG. 3 depicts an improved scheme for selecting streams for garbage collection. As observed in FIG. 3, a logical saturation value is calculated for each stream 301, where, logical saturation is (or correlates to) the percentage of a stream's storage space that is valid. Here, according to at least one embodiment, the SSD allocates storage resources to a stream on a band by band basis.

Generally, the SSD maintains a "free pool" of storage space. That is, the SSD maintains a supply of recently erased storage space that is ready to be written to. When a stream's allocated storage becomes insufficient (the stream's amount of free space runs low) more empty storage space is assigned to it from the free pool. As the amount of storage space in the free pool gets lower, the SSD controller will increase the rate at which it selects streams for garbage collection. The storage space that is reclaimed from the garbage collection process is entered into the free pool. Ideally, the free pool is never empty when a stream needs more storage space.

A first type of SSD assigns entire bands to stream and performs garbage collection over an entire band. As such storage space is added to and subtracted from the free pool in units of bands. In alternate embodiments, conceivably, storage space is assigned to streams in blocks and the garbage collection process reclaims storage space in blocks. In this case, storage space is added to and subtracted from the free pool in units of blocks. For simplicity the remainder of the application will assume band granularity but the reader should understand that the same principles discussed below can also be applied to block (or some other) granularity.

The logical saturation for a particular stream can be calculated, at any moment of time, as the total amount of valid data within the bands that are currently assigned to the stream divided by the combined capacity of these same bands. Here, for typical streams, older or senior assigned bands mainly contain some combination of invalid and valid data (where the amount of invalid data generally increases with increasing band age) whereas newer or younger assigned bands contain more valid data (including initially written new data items) and free space that has not been written to yet.

Thus, in various embodiments, the logical saturation for a stream can be viewed as the amount of stored valid data of the stream normalized by the combination of the valid data, invalid data and free space in the bands assigned to the stream. In essence, the logical saturation is a type of validity rate of the physical storage capacity that has been assigned to the stream.

An SSD controller can calculate the logical saturation for any particular stream in a straightforward manner. Here for instance, the SSD's controller can be designed to maintain an understanding of which blocks have been assigned to a stream (when a band is assigned to a stream, the band's blocks are assigned to that stream) and, for each such block, how many of its pages contain valid data.

A typical SSD controller contains an LBA/PBA table than maintains entries for logical block addresses (LBAs) and corresponding physical block addresses (PBAs). The LBA is the block address specified by the host (for any read or write operation) that sends commands to the SSD. The PBA is the corresponding internal address of the SSD that identifies which physical block in the SSD stores the information targeted by the LBA.

A typical block has the capacity to store many pages. Thus, when a request is received to overwrite an existing page, commonly, the new data is written into a free page's worth of space in the same block where the immediately prior version of the page resides (as no change in LBA/PBA mapping results). The prior version of the page is marked as invalid. Thus, each entry in an LBA/PBA table, or some other data structure, typically includes information from which the number of valid pages in a block can be readily determined.

By keeping a running total of which blocks have been assigned to a stream and how many valid pages exist within each such block, the amount of valid data that is stored for the stream can be readily calculated. Furthermore, the capacity assigned to the stream at any point in time is the product of the number of bands that are currently assigned to the stream, the number of blocks per band and the number of pages per block. Thus, the logical saturation for each stream can be readily determined in real time by the controller as a relatively simple calculation.

With the logical saturation being calculated for each stream 301, an inquiry 302 is made as to the amount of free space that exists in the SSD. If a sufficient amount of free space exists in the SSD, no streams are targeted for garbage collection. By contrast, if the amount of free space in the SSD falls beneath some first lower threshold (low water mark), the stream having the lowest logical saturation is chosen for garbage collection 303. Here, in an embodiment, a specific number of the chosen stream's bands are reclaimed (e.g., with more bands being reclaimed the further the free space is beneath the low water mark) by the garbage collection process 303. Then, a second inquiry is made 304 to see if the free space in the SSD has risen above some second higher threshold (high water mark). If so, the SSD controller returns to looping through inquiry 302. If not, the stream having the lowest logical saturation is chosen for garbage collection, its storage space is reclaimed 303, and the process repeats until the free space grows above the high water mark.

Notably, depending on the state of the logical saturation values at the time the selection 303 is made, the stream that is chosen for garbage collection 303 can be the same stream or a different stream than the stream that was chosen by the immediately preceding stream selection. Here, when a stream is chosen for garbage collection and a set number of its bands are reclaimed, the free space in the SSD increases and the logical saturation of the selected stream increases. That is, post garbage collection, the size of the free pool will have increased and the stream will be storing the same amount of valid data in fewer assigned storage resources.

Thus, in cases where two streams have nearly identical logical saturation values, after one of these streams is selected for garbage collection and its garbage collection is complete, the other stream is likely to be next selected for garbage collection rather than the same stream being selected again. Likewise, in cases where two streams have very different logical saturations, the stream having the much lower logical saturation will likely be repeatedly chosen for garbage collection before the stream having the much higher logical saturation is chosen (eventually the logical saturation of the repeatedly garbage collected stream will exceed that of the other stream).

Figure 4:
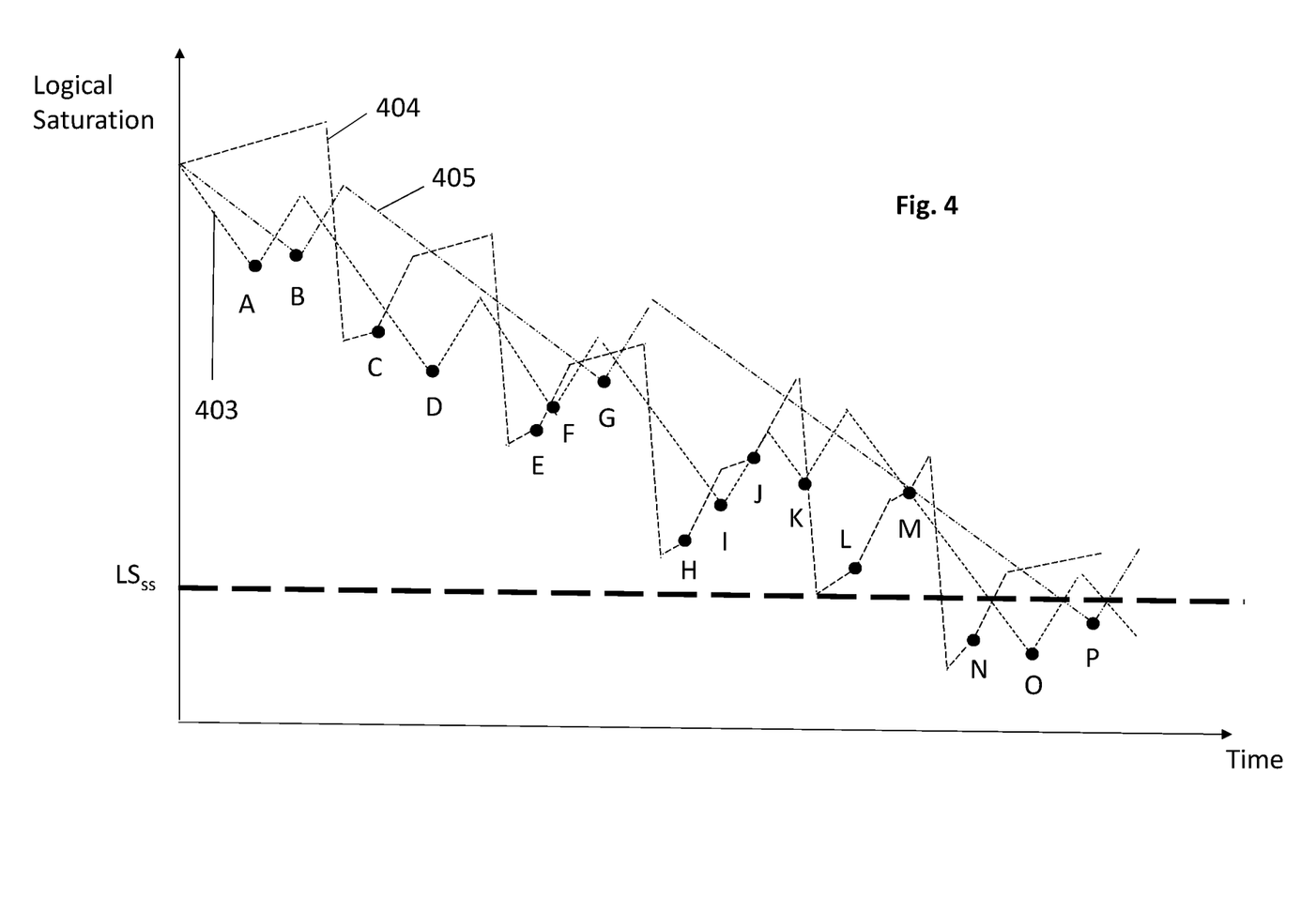
FIG. 4 shows logical saturation values for different streams over a runtime of a solid state drive.

FIG. 4 shows a qualitative demonstration of how the logical saturations will vary for the warm and hot streams 203, 204, 205 originally discussed in FIG. 2. Recalling that FIG. 2 did not attempt to show any changes in the validity rates of the individual streams resulting from garbage collection, by contrast, the logical saturation rates observed in FIG. 4 reflect the garbage collection that occurs from the stream selection process of FIG. 3.

Stream 405 of FIG. 4 corresponds to a warm stream. The warm stream 405 receives access commands at a lesser rate than the hot streams 403, 404 and therefore its logical saturation will fall over time at a slower rate than the hot streams 403, 404 (it receives a slower input rate of over-write commands). The hot streams include a first hot stream 403 that receives over-write commands at a steady/constant rate, and, a second hot stream 404 that receives over-write commands in bursts.

Referring to FIG. 4, each of points A through P represent a decision by the controller to select a particular stream for garbage collection and then perform garbage collection on that stream. Notably, when garbage collection is performed on a stream, the stream's logical saturation rises because the stream's valid to invalid data ratio has increased in the stream's assigned storage space (invalid space has effectively been reclaimed and entered into the free pool). Thus, the particular stream that each of points A through P is located on demonstrates a rise in the stream's logical saturation immediately after the point.

As can be seen in FIG. 4, both hot streams 403, 404 are selected more often for garbage collection than the warm stream 405. Specifically, the warm stream 405 is only selected three times for garbage collection (points B, G and P) whereas the steady hot stream 403 is selected six times (points A, D, F, I, K, O) and the bursty hot stream 404 is selected seven times (points C, E, H, J, L, M, N). As such, the improved selection process of FIG. 3 already behaves differently in a significant way than the traditional approach of selecting the stream with the slowest data rate. That is, whereas the traditional approach will select slower data rate streams more often than faster data rate streams, by contrast, the approach of FIG. 4 shows selection of higher data rate streams more frequently than slower data rate streams.

The cause and effect of selecting the slower date rate streams less frequently is that, over time, more storage space will be assigned to the slower data rate streams than the higher data rate streams. That is, over time, warm stream 405 will have more assigned bands than hot streams 403 and 404. Here, with the hot streams 403, 404 being selected more frequently for garbage collection, their assigned storage space does not appreciate as much because their bands are regularly being reclaimed back to the free pool. By contrast, with the warm stream 405 being selected less frequently than the other two streams, the warm stream will need to regularly ask for more storage space because its invalid data is not being regularly reclaimed.

Note that, for similar reasons, if the cold streams 201, 202 of FIG. 2 were added to the mix of streams in FIG. 4, they would be selected for garbage collection even less frequently than the warm stream 405 and would have larger assigned storage space capacities than the warm stream's.

Thus, the selection process of FIG. 3 is characterized by higher data rate streams: 1) being selected more frequently for garbage collection; and, 2) having less assigned storage space than lower data rate streams. Another characteristic of the selection process of FIG. 3 is that the logical saturations of all streams will eventually converge to approximately the same value (labeled in FIG. 4 as the logical saturation steady state ($LS_{SS}$)). More specifically, there is a modest band about the $LS_{SS}$ steady state that the logical saturation values of all streams will tend to stay within over an extended runtime of the SSD. Both theoretical analysis and simulated analysis has borne this property out.

The convergence of the respective logical saturations of all streams to remain within a band about a particular logical saturation value is believed to be a somewhat optimal state with respect to write amplification avoidance. Here, assuming all streams are of equal priority, it is better for all streams to have approximately the same exposure to write amplification (suffer from it equally) rather than have one stream suffer less from write amplification at the expense of one or more other streams suffering more from write amplification.

According to one perspective, the SSD's overall performance is largely a function of the performance of the stream that suffers the most from write amplification. Thus, with the stream selection approach of FIG. 3 causing all of the streams to settle to an approximately same logical saturation value, no stream is suffering more than any other stream (on average) and the SSD is operating at an approximately optimal state.

Figure 5:
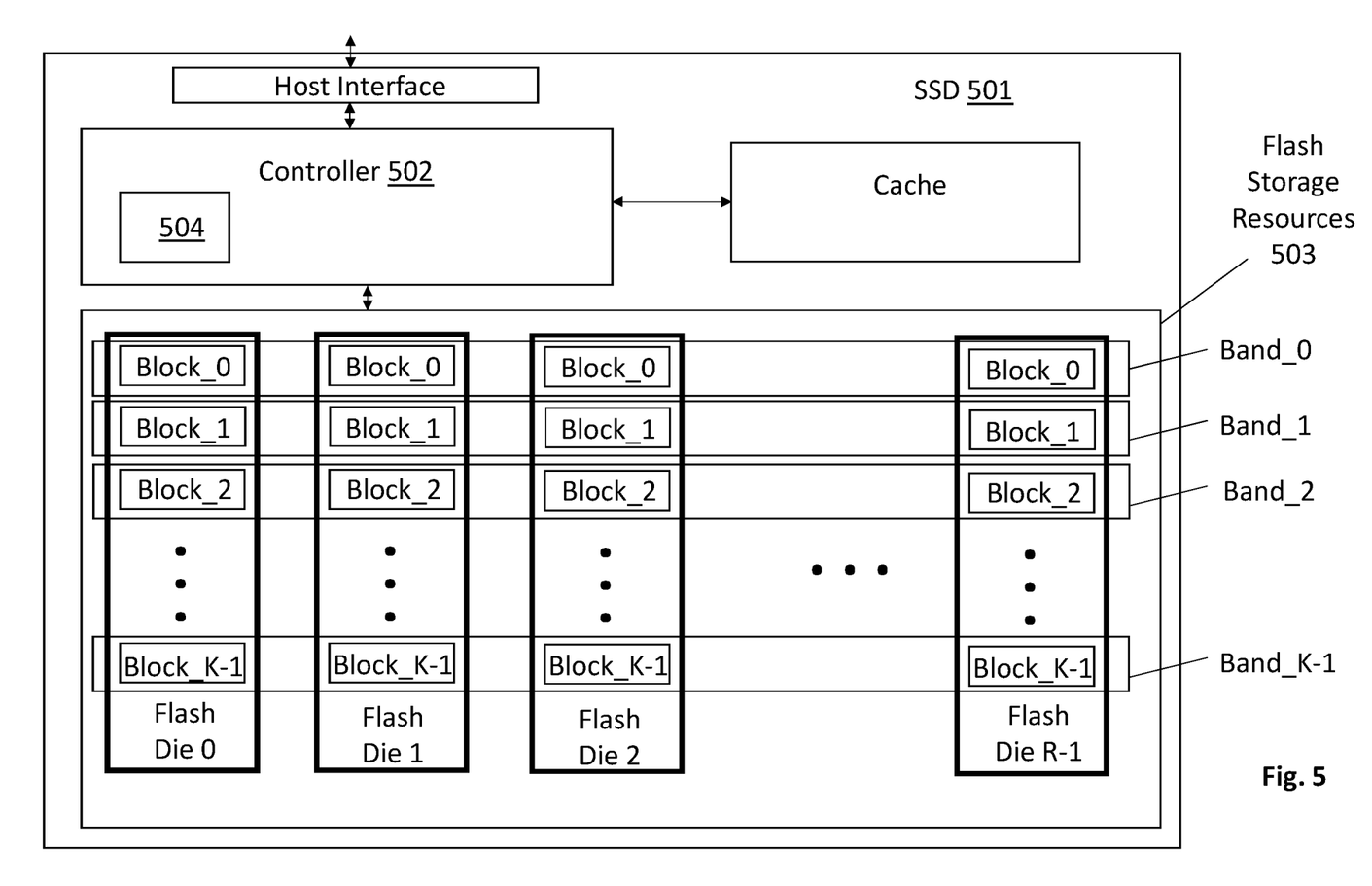
FIG. 5 shows an improved solid state drive.

FIG. 5 shows an SSD 501 having a controller 502 that includes intelligence 503 for implementing the stream garbage collection selection process of FIG. 3. Here, the controller 502 and/or intelligence 503 can be implemented with any of dedicated hardwired logic circuitry, programmable logic circuitry (e.g., field programmable gate array (FPGA) logic circuitry) and/or logic circuitry designed to execute some form of program code (e.g., firmware) such as an embedded processor, embedded micro-controller, etc.

Figure 6:
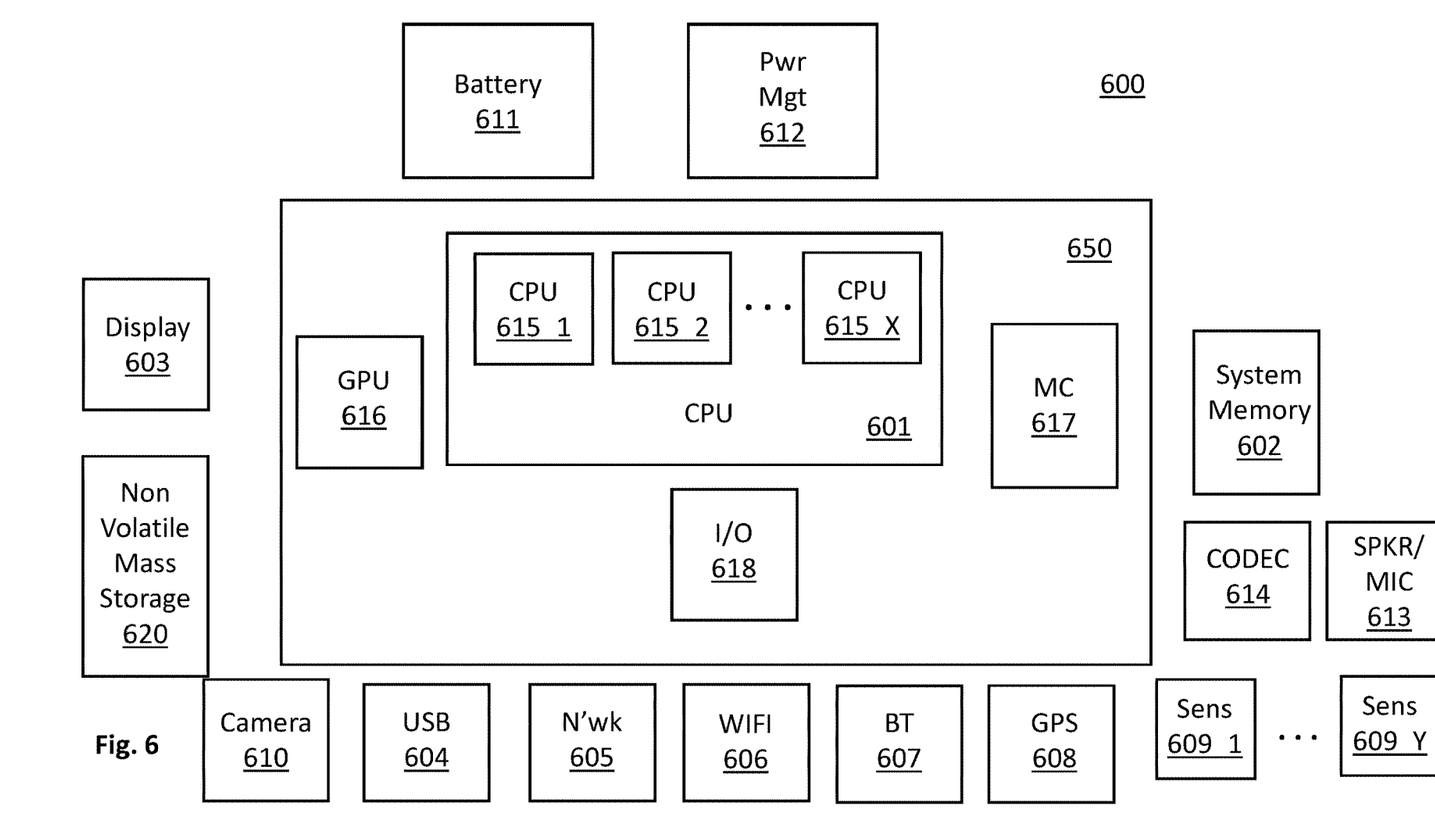
FIG. 6 shows a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile storage 620 which may be the mass storage component of the system. The non-volatile storage 620 may be implemented with an SSD that selects streams for garbage collection based on lowest logical saturation as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a solid state drive (SSD) controller to track a respective logical saturation value for each of multiple streams supported by the SSD, wherein, the multiple streams are realized by the SSD controller assigning write data items having similar host assigned expected lifetimes to same blocks within the SSD, wherein, a stream's logical saturation value is determined from the stream's amount of valid data and the stream's combined amount of valid data, invalid data and assigned storage resources that are free, the controller to repeatedly select for garbage collection whichever of the multiple streams has a lowest logical saturation value as compared to the other streams.

2. The apparatus of claim 1 wherein the logical saturation values for the multiple streams approach a same logical saturation value over an extended runtime of the SSD such that each the multiple streams maintain a comparable ratio of valid data to assigned storage resources.

3. The apparatus of claim 2 wherein any of the multiple streams are capable of exhibiting:
a steady flow of writes to existing data; and,
bursts of writes to existing data.

4. The apparatus of claim 3 wherein the multiple streams are capable of exhibiting varied data rates.

5. The apparatus of claim 2 wherein a first of the multiple streams having a lower data rate is to be assigned more storage resources by the controller than a second of the multiple streams having a higher data rate.

6. The apparatus of claim 1 wherein a first of the multiple streams having a lower data rate is to be assigned more storage resources by the controller than a second of the multiple streams having a higher data rate.

7. The apparatus of claim 1 wherein the controller is to add reclaimed storage resources resulting from garbage collection to a free pool, and, subtract from the free pool storage resources assigned to a stream.

8. The apparatus of claim 7 wherein the storage resources are added to and subtracted from the free pool in units of bands.

9. The apparatus of claim 7 wherein the storage resources are added to and subtracted from the free pool in units of blocks.

10. A computing system, comprising:
a plurality of processing cores;
a system memory;
a main coupled between the system memory and the plurality of processing cores; and,
a mass storage device comprising a controller, the controller to track a respective logical saturation value for each of multiple streams supported by the mass storage device, wherein, the multiple streams are realized by the controller assigning write data items having similar host assigned expected lifetimes to same blocks within the mass storage device, wherein, a stream's logical saturation value is determined from the stream's amount of valid data and the stream's combined amount of valid data, invalid data and assigned storage resources that are free, the controller to repeatedly select for garbage collection whichever of the multiple streams has a lowest logical saturation value as compared to the other streams.

11. The computing system of claim 10 wherein the logical saturation values for the multiple streams approach a same logical saturation value over an extended runtime of the mass storage device such that each the multiple streams maintain a comparable ratio of valid data to assigned storage resources.

12. The computing system of claim 11 wherein any of the multiple streams are capable of exhibiting:
 a steady flow of writes to existing data; and,
 bursts of writes to existing data.

13. The computing system of claim 12 wherein the multiple streams are capable of exhibiting varied data rates.

14. The computing system of claim 11 wherein a first of the multiple streams having a lower data rate is to be assigned more storage resources by the controller than a second of the multiple streams having a higher data rate.

15. The computing system of claim 10 wherein a first of the multiple streams having a lower data rate is to be assigned more storage resources by the controller than a second of the multiple streams having a higher data rate.

16. The computing system of claim 10 wherein the controller is to add reclaimed storage resources resulting from garbage collection to a free pool, and, subtract from the free pool storage resources assigned to a stream.

17. A method, comprising:
 assigning write data items having similar host assigned expected lifetimes to same blocks within a mass storage device;
 tracking a logical saturation value for each of multiple streams comprising read and write commands directed to the mass storage device, wherein, a stream's logical saturation value is determined from the stream's amount of valid data and the stream's combined amount of valid data, invalid data and assigned storage resources that are free; and,
 repeatedly selecting for garbage collection whichever of the multiple streams has a lowest logical saturation value as compared to the other streams.

18. The method of claim 17 wherein the logical saturation values for the multiple streams approach a same logical saturation value over an extended runtime of the mass storage device such that each the multiple streams maintain a comparable ratio of valid data to assigned storage resources.

19. The method of claim 18 wherein any of the multiple streams are capable of exhibiting:
 a steady flow of writes to existing data; and,
 bursts of writes to existing data.

20. The method of claim 19 wherein the multiple streams are capable of exhibiting varied data rates.

* * * * *